Aug. 9, 1966  L. H. HUCKABEE  3,265,042
AIR PREHEATER FOR INDUSTRIAL BOILERS
Filed Dec. 28, 1964

INVENTOR,
Luther H. Huckabee

United States Patent Office 3,265,042
Patented August 9, 1966

3,265,042
AIR PREHEATER FOR INDUSTRIAL BOILERS
Luther H. Huckabee, 4990 Poplar Ave., Memphis, Tenn.
Filed Dec. 28, 1964, Ser. No. 421,322
4 Claims. (Cl. 122—149)

This invention relates to certain new and useful improvements for use in conjunction with industrial boilers, and is particularly directed to means for efficiently preheating the combustion air prior to its entry into the burner in order to enhance the ignition of the burner and the efficiency and operation of the boiler.

In industrial boiler constructions several problems arise from conventional constructions particularly involving the loss of heat generated by the burner through exhaust of the gases through the flue, such loss of heat behaust of the gases through the flue, such loss of heat being a loss in efficiency in the overall operation, and additionally it is found that the air of combustion which is fed to the burner provides a more efficient burner operation if the air is preheated before introduction into the burner per se. Attempts have heretofore been made to utilize the exhaust gases in preheating air introduced into burner systems for industrial boilers, but these systems have in large part been hampered by the fact that the exhaust gases have become mingled with the combustion air and have thus reduced the efficiency of the air for combustion purposes.

The present invention is intended to utilize heat from the waste heat otherwise exhausted through the flue with the exhaust gases to accomplish preheating of the combustion air as well as effecting the segregation of the combustion air from such flue gases and establishing a combustion air chamber in which the heating of the introduced combustion air is effectively accomplished utilizing the waste heat from the flue gases prior to introduction of the combustion air to the burner.

The principal object of the present invention is to provide an industrial boiler including novel means for preheating the combustion air utilizing the waste heat of the flue gases while segregating the flue gases from the combustion air.

A further object of the invention is to provide such a device in which the combustion air is fed into an air chamber which is associated with the burner means and which includes heat radiating means segregating the combustion air chamber from the flue gases of the boiler chamber.

A further object of the invention is to provide such a device in which the combustion air chamber includes a multiplicity of heat radiating fins connected with the segregating means for transmitting the heat retrieved from the flue gases for association with the combustion air to effect preheating thereof.

A further object of the invention is to provide such a device in which the heat radiating fins are arranged in an irregular pattern so as to effect disrupting of the flow of air to create a turbulence therein as the combustion air is fed into the chamber in order to hold the combustion air in the chamber for a sufficient time to acquire a desired degree of preheating prior to introduction to the burner means; and A further object of the invention is generally to improve the design, constructions and efficiency of means for preheating combustion air for introduction into burner means for heating industrial boilers.

The means by which the foregoing and other objects of the present invention are accomplished and the manner of their accomplishment will be readily understood from the following specification upon reference to the accompanying drawings, in which.

Figure 1:
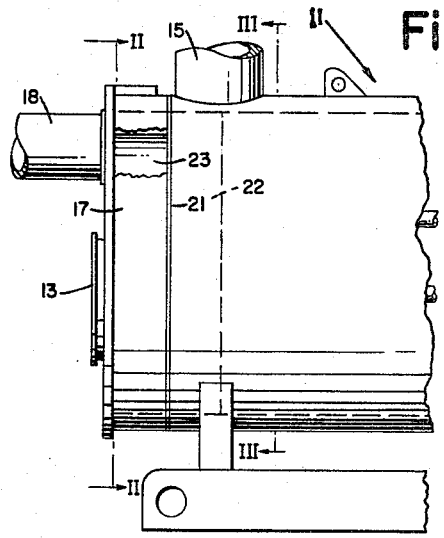
FIG. 1 is a fragmentary side elevational view with parts broken away for purposes of illustration showing an industrial boiler with the present invention installed thereon.
Figure 3:
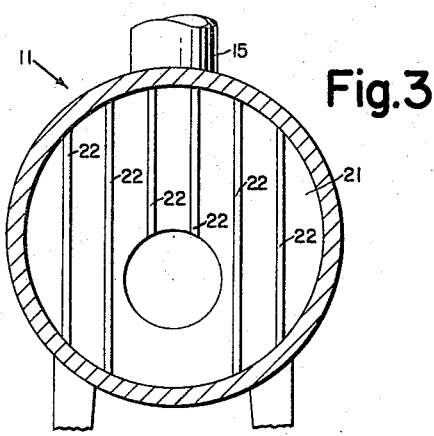
FIG. 3 is a fragmentary sectional view taken as on the line III—III of FIG. 1 on the scale of FIG. 1, and further illustrating details of the present invention, the conventional tubes of the boiler being omitted.

Referring now to the drawings in which the various parts are indicated by numerals, an industrial boiler 11 is shown by way of illustration and example, it being understood that other types and dimensions of industrial boilers may be utilized in connection with the present invention without departing herefrom.

As is usual, boiler 11 includes in its interior (not shown) a fire box or heating chamber and a water chamber in which the material to be heated is exposed usually in suitable tubes to the heat introduced into the fire box or heating chamber. Heating of the interior of the fire box is supplied by a heater 13 and comprises a combustion burner to which air of combustion is fed and which ejects the heated exhaust into the fire box of the boiler.

Substantially adjacent to the heater end of boiler 11, boiler 11 is provided with an exhaust flue 15 from which the exhaust heating gases which have been ejected into boiler 11 from heater 13 are exhausted to the exterior of the boiler for discharge therefrom after having served for heating the tubes in the boiler 11.

Heater 13 is mounted within a combustion air chamber 17, which surrounds heater 13 and provides a means of delivering air for combustion to the heater. Chamber 17 communicates as at 18 through an air inlet with an air supply fan 19 which supplies external air to the interior of the chamber 17 for delivery to heater 13. Chamber 17 is segregated from the interior of boiler 11 by a plate 21.

Plate 21 is effective to provide a baffle or divider segregating the exhaust gases of the interior of boiler 11 from the combustion air of chamber 17, preventing the intermingling of the same, and thus enhancing the combustion of heater 13 without the detraction from such combustion by the presence of exhaust gases therein. Plate 21 is directly exposed to the heat of the exhaust gases within boiler 11 adjacent flue 15, the waste heat of which is normally discharged through exhaust flue 15. Plate 21 is a metallic heat radiating plate and is adapted to take up from the exhaust gases within boiler 11 the waste heat to the extent of the plate and to transmit such heat taken up from the exhaust gases into the combustion air contained in the combustion air chamber 17.

Plate 21 is provided with a plurality of substantially vertically disposed heat absorption fins 22, which are mounted to plate 21 in heat transfer relationship and extend into boiler 11, assisting in the heat transfer desired from the boiler interior to plate 21 for radiation in chamber 17.

Perpendicularly fixed to plate 21 and extending away from boiler 11 within chamber 17 are a plurality of independent, irregular, heat radiating fins 23, 24, 25, 26, 27, 28, 29, which are affixed to plate 21 so as to receive therefrom and to transmit and radiate the heat from said plate 21 as it is accumulated from the exhaust gases within boiler 11. The heat radiating fins extend perpendicularly from plate 21 substantially throughout the thickness of chamber 17 so that substantially all of the air introduced by fan 19 into chamber 17 is required to pass over and among the irregularly disposed fins.

The heat radiating fins are formed of suitable metal having a high radiation coefficiency such as aluminum, although, of course, other suitable metals may be employed if desired. The fins are disposed in an irregular pattern which is approximately arranged clockwise relative to the air inlet 18 so as to receive, guide and turbulate the air which is introduced from the inlet into the air chamber 17.

It will be noted that the heat radiating fins are not symmetrically disposed and are not concentrically arranged, but instead are irregularly arranged so that the air delivered from the air inlet into the fins is received and guided by the fins but is passed along the fins and is submitted to a turbulence particularly by the irregular arrangement of the fins and the interruptions in the fins so as to maintain the air in the combustion air chamber for a sufficient period of time to enable the heat radiated by plate 21 and the heat radiating fins to preheat the combustion air before it is delivered to the burner 13.

Figure 2:
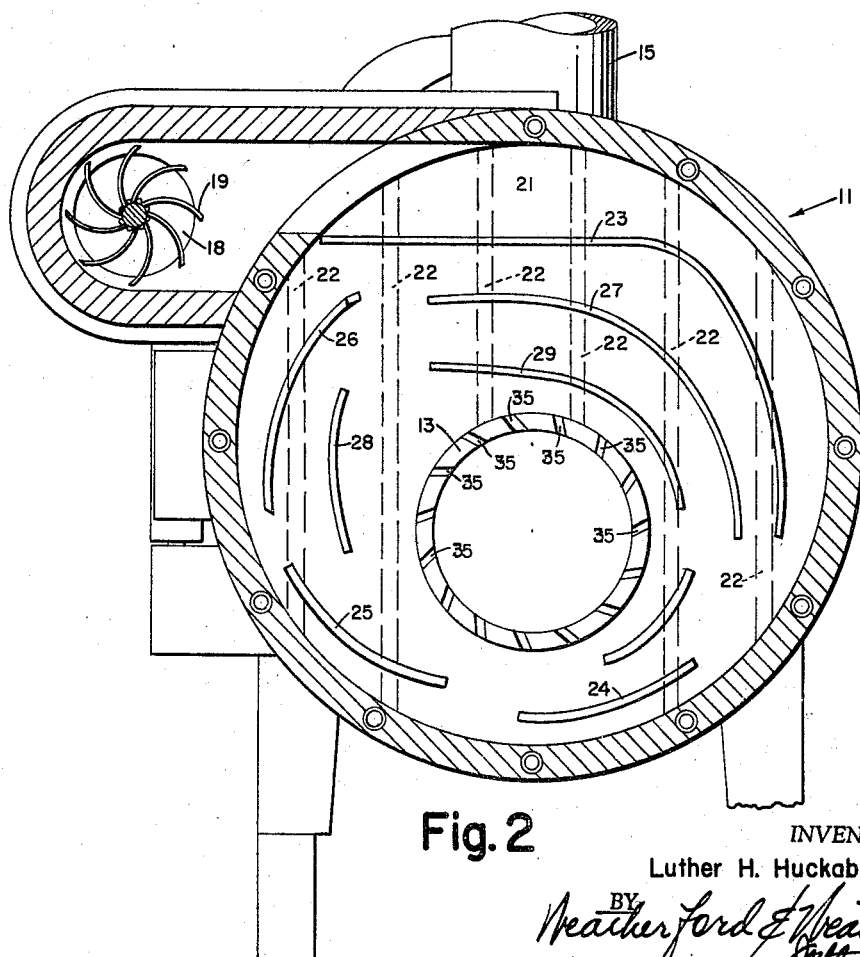
FIG. 2 is a sectional view taken as on the line II—II of FIG. 1 on an enlarged scale.

Thus it will be seen that fin 23 projects so as substantially to reach to air inlet 18, and thence extends in a generally clockwise direction, as seen in FIG. 2, out of parallelism with the casing of the combustion chamber and curving so as to extend still in a generally clockwise direction to its termination. The fin 23 is separated from the next succeeding fin in clockwise direction, the fin 24, by a gap so that the air which has been introduced is enabled to have a relief from the fin control and to establish a beginning turbulence. Fin 25, next in sequence in the generally clockwise arrangement, is gapped from fin 24 and is disposed out of alinement with the end of fin 24, so as to enhance the turbulence created in the air, it being observed that the fin 25 is spaced somewhat further away from the casing of the chamber at its beginning end proximate to fin 24 than it is at its distal end remote from fin 24, thus enhancing the change in speed and flow of the air. Fin 26 is similarly gapped from fin 25, and fin 26 extends in a continuation of the general clockwise pattern approximately to the lower edge of the air inlet so as to serve as a deflector insuring that the air coming into the chamber from air inlet 18 is directed in the desired approximately clockwise direction. Fin 27 is somewhat alined with the end of fin 26 and with the lower edge of air inlet 18 and extends in a curving direction continuing the generaly clockwise arrangement and within the extent of fin 23. Fin 28 is disposed substantially oppositely from the fin 27 and within fins 25, 26, overlying the gap between fins 25, 26, and effectively interrupting the flow of air therethrough so as to direct the same and to maintain the generally clockwise flow while establishing the turbulence therein, and fin 29 is most proximate to the heater 13, lying within the fin 27 and being gapped away from the end of fin 28, so that the turbulent air delivered into the combustion air chamber is thus guided eventually into the heater 13 for combustion being delivered as through the slots 25 after the preheating of such delivered air, enhancing the combustion in heater 13 and its subsequent delivery to boiler 11.

It will be observed that the arrangement of the heat radiating fins is in a generally clockwise arrangement relative to the introduction of air from air inlet 18, and is in an approximately spiral arrangement. However, it will be observed that the arrangement is not spiral and is not uniform and is preferably of the irregular and interrupted arrangement as set forth and described herein and as shown in FIG. 2.

Thus the heat radiating fins not only are effective to establish radiation of heat from the exhaust gases through plate 21, but also are effective as flow disrupting fins which interrupt and disrupt the airflow introduced from air inlet 18 so as to retain the introduced air of combustion segregated from the exhaust gases in an extended period of time within the combustion chamber so as to enable satisfactory preheating of the air prior to the introduction thereof into heater 13.

It will be seen that the combustion air chamber, including the heater, the plate 21 and the heat radiating fins, may be organized as a single unit which can be simply attached to the entrant end of a boiler 11 for use in accordance with the teaching of this invention, and that the device is effective to preheat air introduced into the combustion chamber prior to its delivery to the heater so as to enhance the efficiency of the heater which in turn delivers to the boiler the heated exhaust gas, the exhaust passing in a generally spiral pathway down the boiler in manner similar to that shown in Patent No. 3,048,215, and with the exhaust gases returning after the spiral pathway down the boiler to exhaust through flue 15 adjacent plate 21 with the waste heat of the exhaust gases heating plate 21 and consequently the heat radiating fins so as to effect the preheating of the air of combustion continuously being introduced into the combustion chamber.

It, of course, will be understood that this device may be modified in the arrangement of the heat radiating fins, and that other arrangements of such fins for the purpose of radiating heat and for the purpose of disrupting airflow into the combustion chamber so as to maintain the air within the chamber for sufficient time to effect its preheating, may be adopted without departing herefrom. It will further be understood that the particular type of boiler may be varied without departing from the present invention.

As is shown in the drawings, heater 13 is provided with slots 35 which are disposed so as to intercept and receive the combustion air from the combustion air chamber in the generally spiral direction and disposition established by the heat radiating fins within the combustion air chamber.

I claim:

1. Means for preheating air from use in firing industrial boilers, comprising in combination a boiler to be fired, a chamber mounted on one end of said boiler, an exhaust flue adjacent said end of said boiler for exhausting gases from said boiler, said chamber including a heat radiating plate segregating the gases in said boiler from said chamber, said plate retrieving heat from said gases adjacent said flue and being heated thereby, a burner communicating from said chamber through said plate into said boiler and discharging into said boiler heated products of combustion including exhaust gases, air supply means delivering into said chamber air for combustion by said burner, a plurality of irregularly disposed discontinuous heat radiating fins mounted on said plate within said chamber in heat exchange relation to said plate, at least one of said fins initially intercepting and guiding the air delivered by said air supply means, said fins being respectively gapped apart and positioned surrounding said burner and disrupting air flow from said air supply means to said burner and creating a turbulence in said air flow whereby to extend the retention of said delivered air in said chamber exposed to said fins and said plate, said fins being heated from the heat exchange relation with said plate, said fins and said plate preheating said delivered air.

2. Means for preheating air for use in firing industrial boilers, comprising in combination a boiler to be fired, a chamber mounted on one end of said boiler, an exhaust flue adjacent said end of said boiler for exhausting gases from said boiler, said chamber including a heat radiating plate segregating the gases in said boiler from said chamber, said plate retrieving heat from said gases adjacent said flue and being heated thereby, a burner communicating from said chamber through said plate into said boiler and discharging into said boiler heated products of combustion including exhaust gases, air supply means delivering into said chamber air for combustion by said burner, a plurality of irregularly disposed discontinuous heat radiating fins mounted on said plate within said chamber in heat exchange relation to said plate, at least one of said fins initially intercepting and guiding the air delivered by said air supply means, said fins being respectively gapped apart and positioned surrounding said burner and disrupting air flow from said air supply means to said burner and creating a turbulence in said air flow whereby to extend the retention of said delivered air in said chamber exposed to said fins and said plate, said fins being heated from the heat exchange relation with said plate, said fins and said plate preheating said delivered air, the innermost of said fins proximate to said burner finally guiding said preheated delivered air to said burner for enhancing burner combustion and discharge of products of combustion to said boiler.

3. Means for preheating air for use in firing industrial boilers, comprising in combustion a boiler to be fired, a chamber mounted on one end of said boiler, an exhaust flue adjacent said end of said boiler for exhausting gases from said boiler, said chamber including a heat radiating plate segregating the gases in said boiler from said chamber, said plate retrieving heat from said gases adjacent said flue and being heated thereby, a burner communicating from said chamber through said plate into said boiler and discharging into said boiler heated products of combustion including exhaust gases, air supply means delivering into said chamber air for combustion by said burner, a plurality of irregularly disposed discontinuous heat radiating fins mounted on said plate within said chamber in heat exchange relation to said plate, at least one of said fins initially intercepting and guiding the air delivered by said air supply means, said fins being respectively gapped apart and positioned in a non-spiral relationship surrounding said burner and disrupting air flow from said air supply means to said burner and creating a turbulence in said air flow whereby to extend the retention of said delivered air in said chamber exposed to said fins and said plate, said fins being heated from the heat exchange relation with said plate, said fins and said plate preheating said delivered air.

4. Means for preheating air for use in firing industrial boilers, comprising in combination a boiler to be fired, a chamber mounted on one end of said boiler, an exhaust flue adjacent said end of said boiler for exhausting gases from said boiler, said chamber including a heat radiating plate segregating the gases in said boiler from said chamber, said plate retrieving heat from said gases adjacent said flue and being heated thereby, a burner communicating from said chamber through said plate into said boiler and discharging into said boiler heated products of combustion including exhaust gases, air supply means delivering into said chamber air for combustion by said burner, a plurality of irregularly disposed discontinuous heat radiating fins mounted substantially perpendicularly on said plate within said chamber in heat exchange relation to said plate, at least one of said fins initially intercepting and guiding the air delivered by said air supply means, said fins being respectively gapped apart and positioned in a non-spiral relationship surrounding said burner and disrupting air flow from said air supply means to said burner and creating a turbulence in said air flow whereby to extend the retention of said delivered air in said chamber exposed to said fins and said plate, said fins being heated from the heat exchange relation with said plate, said fins and said plate preheating said delivered air, the innermost of said fins proximate to said burner finally guiding said preheated delivered air to said burner for enhancing burner combustion and discharge of products of combustion to said boiler.

References Cited by the Examiner

UNITED STATES PATENTS

| | | | |
|---|---|---|---|
| 1,128,146 | 2/1915 | Jacobs | 158—36 X |
| 1,689,667 | 10/1928 | Free | 158—36 X |
| 2,000,733 | 5/1935 | Avery | 158—1.5 X |
| 2,390,056 | 12/1945 | Cleaver et al. | 158—1.5 |
| 2,674,981 | 4/1954 | Clarkson | 122—149 X |
| 2,985,438 | 5/1961 | Prowler | 158—36 X |

KENNETH W. SPRAGUE, *Primary Examiner.*